Aug. 4, 1931.   H. SAITO   1,817,421
LINING BRICK FOR ROTARY CEMENT KILNS
Filed Oct. 18, 1927

H. Saito
INVENTOR

By: Marks & Clerk
Attys.

Patented Aug. 4, 1931

1,817,421

UNITED STATES PATENT OFFICE

HACHIRO SAITO, OF TOKYO-FU, JAPAN

LINING BRICK FOR ROTARY CEMENT KILNS

Application filed October 18, 1927. Serial No. 226,975.

The present invention relates to improvements in lining brick for rotary cement kilns, in which there are combined super refractory materials such as silicon-carbide, corundum or fused bauxite and ordinary refractory materials like fire-clay or agalmalolite to form a block in such a manner that when they are applied to the kiln, their surfaces may be exposed to sintering clinker. The object thereof is to obtain brick for lining having high resistance to abrasion, corrosion and thermal shock that is to say a sudden change of temperature and enable the kiln to increase the production of cement clinker of excellent and uniform quality by decreasing the heat conductivity of the lining and at the same time making the formation and fixing of the clinker coating favorable by the intervention of fire clay brick portions. By the term "clinker coating" is meant the lining of clinker of cement material deposited on the brick during the sintering of the cement.

Figure 1:
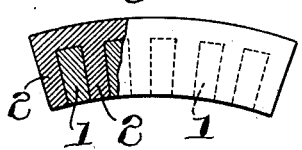
Figure 3:
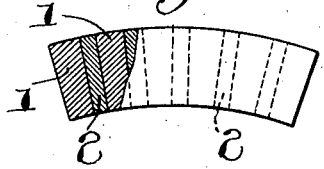
Figure 2:
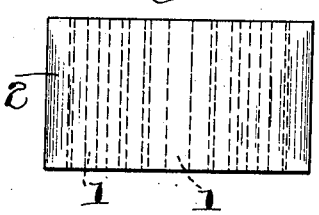
Figure 4:
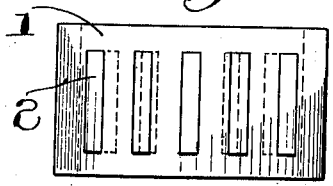
Figure 5:
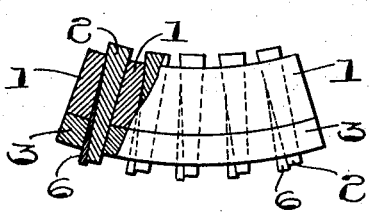
Figure 6:
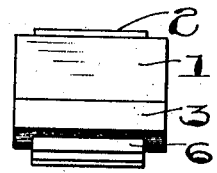

Referring to the accompanying drawings, Figs. 1 and 2 show an example of the brick utilized in this invention. Fig. 1 is front view partly in section; and Fig. 2, a plan of the same. Figs. 3 to 4 show the modification of the same in which Fig. 3 is front view partly in section and Fig. 4, a plan. Fig. 5 is front view of another modification partly in section; Fig. 6, side view of the same; and Fig. 7, a plan. The same reference numbers indicate the same parts.

Now, the lining material of the rotary cement kiln must be sufficiently refractory and resist the corrosion caused by sintering raw materials of the cement clinker. Also, it must have strong resistance to abrasion and thermal shock, small coefficient of expansion and contraction and conduction of heat, and induce other favorable conditions for the formation and fixing of the clinker coating. Such favorable conditions of the lining also include the non-cracking of the lining during sudden change in temperature; it must not show great permanent shrinkage by heating; it must have small heat conductivity; and lastly the lining must cause the clinker to adhere firmly to the surface.

However, with a single kind of material the ideal lining brick which can fulfill all of these conditions is hard to obtain. For instance, fire clay brick is good for forming the clinker coating. It stands the sudden change of temperature pretty well and is a poor conductor of heat, but the refractoriness or the resistance to abrasion or corrosion is not sufficient. Besides, frequent repairing being necessary owing to wearing and frequent slipping off of the lining brick, it is not only impossible to use sufficiently high temperature to burn the cement material to form a good clinker, but also to insure long-continuous operation, thus reducing the efficiency of the kiln to produce cement clinker and making it impossible to yield a product of uniform quality. The silicon-carbide, corundum and the fused bauxite bricks on the contrary are expensive. Especially, with silicon-carbide brick, the coating is difficult to be formed or kept in its position and the conductivity of heat is too great. The fused bauxite or corundum brick is not sufficiently strong for the sudden change of temperature. In the present invention the brick for lining is composed of the silicon-carbide, corundum or fused bauxite brick as the chief component and together with the ordinary fire brick such as of fire clay or agalmalolite which are compounded together in such a manner that when it is used in the kiln for the lining, the fireclay part may be placed between the silicon-carbide parts. Thus, the lining composed of the said brick is provided with the characteristics of both the silicon-carbide refractory and the fire clay refractory, and has the surface which resists abrasion and corrosion and thermal shock and wears well, the clinker coating being formed and kept on the surface pretty well. Further, it is much less expensive than the lining of the silicon-carbide brick alone and is very easy to carry into practice.

The following is a manner of carrying the invention into practice:—

1. As shown in Figs. 1 and 2, make a skeleton of super refractory (1) of the material such as silicon carbide, corundum or fused bauxite and fit it into kneaded body of shamotte fire clay or agalmalolite. Then, burn the same; or after burning join them together to form a block having layer of super refractory material and layer of ordinary refractory material in such a manner that when used in the kiln the bricks always expose their surfaces alternately.

2. As shown in Figs. 3 and 4, make a frame of super refractory (1) such as silicon carbide, corundum or fused bauxite. Make several holes in the interior of the above frame and fill them with a body of common refractory (2) like fire clay, agalmalolite or shamotte, thrusting its end into the upper or under surface or both if necessary, and insert brick of such nature in a body in such a manner that when it is used for the lining of the rotary kiln, the common refractory part and the super refractory part expose their surfaces alternately.

Figure 7:

3. As shown in Figs. 5 to 7, make a brick body (1) of silicon carbide having tapered holes, corundum or fused bauxite. Lay on its back a brick body (3) made of clay and provided with the holes corresponding to the above holes. Insert a wedge-shaped brick body of shamotte (2) into a conical hole in such a manner that its both ends protrude, and then fix it with a metallic wedge 6 driven from the back, thus making the whole into one body. When it is used to line the rotary kiln, shave the protruding ends at the back in order to fit it tightly to the kiln shell. In this way, the super and ordinary refractory parts are arranged in an alternate position in the lining. In short, in this invention the main part of the brick is made of super refractory like silicon carbide, corundum or fused bauxite interposed by a layer of shamotte, fire clay or agalmalolite.

Thus, according to the present invention the lining brick does not slip off, keeps the merits of super refractories such as highest refractoriness, great resistance to corrosion, abrasion and thermal shock and diminishes stoppage and repairing. Moreover, it can not only bear much higher operating temperature, but also improve the defect of same in unreliable forming and keeping of clinker coating and in heat loss by radiation due to great conductivity of the same, and as it replaces a part of super refractories by cheaper common refractory, it is made much more economical as compared with the employment of expensive super refractories alone. In this way, it enables the kiln to increase the production of superior and uniform quality by using higher operating temperature and disposing of frequent interruption.

Claims:

1. A lining brick for kilns comprising a brick composed of super-refractory material, said brick being provided with a plurality of recesses and a plurality of clay bricks in said recesses, the surfaces of said refractory bricks and clay bricks being in alternate positions on the face of the lining brick.

2. A lining brick for kilns comprising a super-refractory brick having fused alumina for its chief component, said brick being provided with recesses and a plurality of clay bricks in said recesses, the surfaces of said refractory bricks and clay bricks being arranged alternately in the face of said lining brick.

3. A lining brick for kilns comprising a heat resistant refractory brick, said brick being provided with a plurality of recesses extending through the brick, and a plurality of clay bricks having a poor co-efficient conductivity in said recesses, said refractory bricks and clay bricks being arranged alternately in the face of said lining brick.

4. A lining brick for a kiln consisting of a silicon carbide body provided with equally spaced recesses opening inwardly of the kiln, a burnt clay member fitting into each of said recesses, the surfaces of said silicon carbide body and the clay member being alternately exposed to the interior of the kiln.

5. A lining brick for a kiln, consisting of a frame of burnt clay provided with equally spaced recesses, a silicon carbide body fitting in each of said recesses, the surfaces of the silicon carbide body and the clay member being alternately exposed to the interior of the kiln.

6. A lining brick for a kiln, comprising two layers contacting with each other, one of said layers facing inwardly of the kiln and consisting of silicon carbide, the second kiln facing the kiln shell and consisting of burnt clay, said two layers being provided with registering radial apertures, and burnt clay members inserted in said apertures, whereby the surfaces of silicon carbide and burnt clay are exposed alternately to the interior of the kiln.

In testimony whereof I have affixed my signature.

HACHIRO SAITO.